(12) United States Patent
Wildhagen et al.

(10) Patent No.: US 7,505,983 B2
(45) Date of Patent: Mar. 17, 2009

(54) EXTENDING DATA FLOWS

(75) Inventors: Andreas U. Wildhagen, Angelbachtal (DE); Daniel Wachs, Mannheim (DE)

(73) Assignee: SAP AG (DE)

( * ) Notice: Subject to any disclaimer, the term of this patent is extended or adjusted under 35 U.S.C. 154(b) by 411 days.

(21) Appl. No.: 11/475,355

(22) Filed: Jun. 26, 2006

(65) Prior Publication Data

US 2007/0299704 A1 Dec. 27, 2007

(51) Int. Cl.
*G06F 7/00* (2006.01)

(52) U.S. Cl. ...................................... 707/100

(58) Field of Classification Search .............. 707/1–10, 707/100–103
See application file for complete search history.

(56) References Cited

U.S. PATENT DOCUMENTS

| | | | |
|---|---|---|---|
| 5,187,788 A | 2/1993 | Marmelstein | 717/109 |
| 5,295,222 A | 3/1994 | Wadhwa et al. | 717/104 |
| 5,321,803 A | 6/1994 | Ditter, Jr. | 715/703 |
| 5,499,357 A | 3/1996 | Sonty | 710/104 |
| 5,553,218 A | 9/1996 | Li et al. | 707/102 |
| 5,687,366 A | 11/1997 | Harvey, III | 707/10 |
| 5,717,924 A | 2/1998 | Kawai | 707/102 |
| 5,721,912 A | 2/1998 | Stepczyk et al. | 707/102 |
| 5,778,373 A | 7/1998 | Levy et al. | 707/100 |
| 5,838,918 A | 11/1998 | Prager | 709/221 |
| 5,913,218 A | 6/1999 | Carney | 707/200 |
| 5,950,190 A | 9/1999 | Yeager et al. | 707/3 |
| 5,978,579 A | 11/1999 | Buxton et al. | 717/107 |
| 6,038,586 A | 3/2000 | Frye | 709/100 |
| 6,047,279 A | 4/2000 | Barrack | 706/60 |
| 6,098,098 A | 8/2000 | Sandahl | 709/221 |
| 6,128,730 A | 10/2000 | Levine | 713/1 |
| 6,182,279 B1 | 1/2001 | Buxton | 717/3 |
| 6,195,794 B1 | 2/2001 | Buxton | 717/11 |
| 6,202,207 B1 | 3/2001 | Donohue | 717/11 |
| 6,219,696 B1 | 4/2001 | Wynblatt | 709/218 |

(Continued)

FOREIGN PATENT DOCUMENTS

GB 2334601 8/1999

OTHER PUBLICATIONS

Ryder, B.G., Institute of Electrical and Electronics Engineers: "ISMM: The Incremental Software Maintenance Manager*", *Proceedings of the Conference on Software Maintenance*, Miami (Oct. 16, 1989), pp. 142-164.

(Continued)

*Primary Examiner*—Wilson Lee
(74) *Attorney, Agent, or Firm*—Fish & Richardson P.C.

(57) ABSTRACT

Systems and techniques for extending data flows are thus described. In one aspect, an article includes one or more machine-readable media storing instructions operable to cause one or more machines to perform operations. The operations can include receiving extension information identifying an extension of a first object in a data processing system landscape, accessing data flow information to identify one or more data flows that involve the first object, and extending, on the basis of identifying the one or more data flows as involving the first object, at least some of the one or more data flows so that information in the extension is conveyed between instances of the first object and instances of a second object during data processing in the data processing system landscape. The identified data flows convey stored information from one object to another.

20 Claims, 13 Drawing Sheets

U.S. PATENT DOCUMENTS

| | | | |
|---|---|---|---|
| 6,219,719 B1 | 4/2001 | Graf | 710/1 |
| 6,243,747 B1 | 6/2001 | Lewis | 709/220 |
| 6,330,586 B1 | 12/2001 | Yates | 709/201 |
| 6,339,755 B1 | 1/2002 | Hetherington | 704/5 |
| 6,366,917 B1 | 4/2002 | Herbert | 707/100 |
| 6,463,430 B1 * | 10/2002 | Brady et al. | 707/3 |
| 6,473,794 B1 | 10/2002 | Guheen | 709/223 |
| 6,507,813 B2 | 1/2003 | Veditz et al. | 704/8 |
| 6,532,491 B1 | 3/2003 | Lakis et al. | 709/223 |
| 6,560,704 B2 | 5/2003 | Dieterman | 713/100 |
| 6,718,464 B2 | 4/2004 | Cromer et al. | 713/2 |
| 6,792,462 B2 | 9/2004 | Bernhardt | 709/225 |
| 6,857,123 B1 | 2/2005 | Nuxoll et al. | 719/316 |
| 6,868,427 B2 * | 3/2005 | Herzog et al. | 707/104.1 |
| 6,990,601 B1 | 1/2006 | Tsuneya | 714/4 |
| 2003/0225937 A1 | 12/2003 | Reiss et al. | 709/332 |
| 2004/0139018 A1 * | 7/2004 | Anderson et al. | 705/41 |

OTHER PUBLICATIONS

SAP AG, European Search Report dated Oct. 16, 2007 of the European Patent Application No. 07012072, 8 pages.

Tokuda, L. et al., "Automated Software Evolution via Design Pattern Transformations", Technical Report: CS-TR-95-06, University of Texas at Austin, [online], pp. 1-13 (Oct. 1995). [Retrieved on Sep. 21, 2007]. Retrieved from the Internet: <http://www.cs.utexas.edu/ftp/pub/predator/tr-95-06.pdf>.

Georgakopoulos, D. et al., "Customizing Transaction Models and Mechanisms in a Programmable Environment Supporting Reliable Workflow Automation", *IEEE Transaction on Knowledge and Data Engineering*, vol. 8, No. 4 (Aug. 1996), pp. 630-649.

Islam, N., "Customizing System Software Using OO Frameworks", *Computer*, vol. 30 (Feb. 1997), pp. 69-78.

Microsoft Corporation, "A Freaky Microsoft Dynamics CRM 3.0 Blog: Map this please...", 2 pages [online], Mar. 10, 2006. Retrieved from the Internet: <URL: http://blogs.msdn.com/mscrmfreak/archive/2006/03/10/548705.aspx> on Dec. 19, 2006.

Microsoft Corporation, "Microsoft CRM Customization: White Paper", 18 pages [online], Apr. 2003. Retrieved from the Internet: <URL: http://download.microsoft.com/download/6/8/2/682eb842-1a43-4026-af6d-3dbb81cb151b/CRM_Customization_White_Paper.doc> on Dec. 19, 2006.

Ramanathan, J. et al., "Providing Customized Assistance for Software Lifecycle Approaches", *IEEE Transactions on Software Engineering*, vol. 14, No. 6 (Jun. 1988), pp. 749-757.

SAP AG, "Customizing Scout,", *SAP Service Market Place*, Mar. 19, 2001, 2 pages.

SAP AG, "Designing Mappings", 2 pages [online], 2006. Retrieved from the Internet: <URL: http://help.sap.com/saphelp_nw04/helpdata/en/d2/58cd3b11571962e10000000a11402f/frameset.htm> on Dec. 19, 2006.

SAP AG, "Message Mappings", 3 pages [online], 2006. Retrieved from the Internet: <URL: http://help.sap.com/saphelp_nw04/helpdata/en/49/1ebc6111ea2f45a9946c702b685299/content.htm> on Dec. 19, 2006.

* cited by examiner

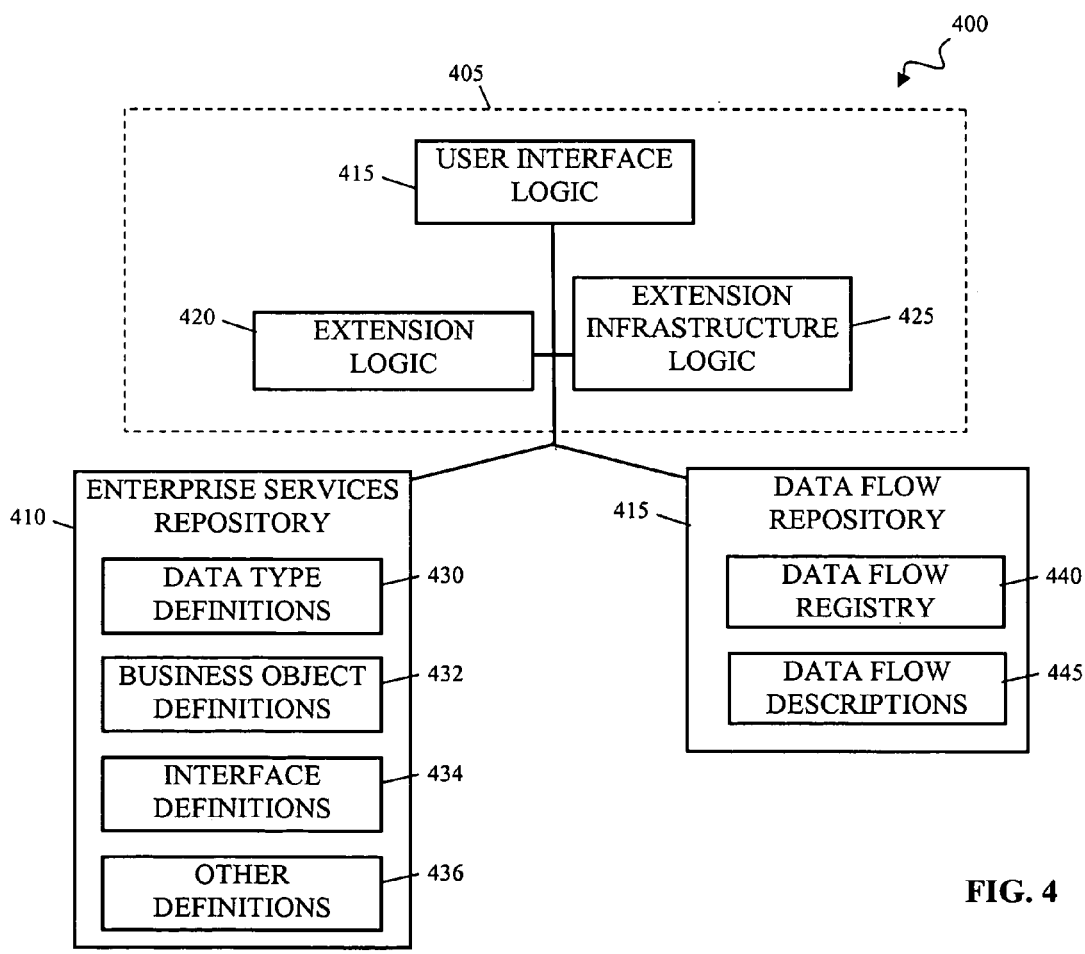

| IDENTIFIER | SOURCE ID | SOURCE DESC | TARGET ID | TARGET DESC |
|---|---|---|---|---|
| Data Flow 1 | Source 1 | Desc 1 | Target 1 | Desc 6 |
| Data Flow 2 | Source 2 | Desc 3 | Target 2 | Desc 5 |
| ... | ... | ... | ... | ... |
| Data Flow N | Source N | Desc N | Target N | Desc N |

Create Field

Object Identifier —— 702

Text Information

Heading [        ]   Label: * [            ] ⎱ 705
Tool Tip: * [                              ]

Type Information

Type: * [Numerical Type (NUMC)]   Length: * [          1]  ⎱ 710
Decimals: [        ]

Value Help Information

☑ Provide Value Help   Value Help Properties  ⎱ 715

Additional Information

Default value: [          ]   Status: ⎱ 720

[Save and Close] [Cancel]
     \              \
     725            730

FIG. 7

Create Field

SalesOrder - ItemProduct — 702

Text Information

Heading: *　　[       ]　　Label: *　　[       ]　　} 705
Tool Tip: *　　[                              ]

Type Information

Type: *　　[Numerical Type (NUMC) ▼]　　Length: *　　[          2]　　} 710
Decimals:　　[       ]

Value Help Information

☑ Provide Value Help　　Value Help Properties　　} 715

Additional Information

Default value:　　[       ▼]　　Status:　　} 720

Document Flow Information

| Active | Extension Scenario | Description |
|---|---|---|
| ☑ | FROM_SALES_TO_INVOICING | From Sales Order to Customer Invoice |
| ☐ | FROM_PROD_TO_INVOICING | From Production to Customer Invoice |

1515 — checkbox row; 1520 — second row; 1510 scenario area; 1505 entire section

[Save and Close]  [Cancel]
      725          730

FIG. 15

| EXTEN. SET IDENTIFIER | ORIGINATING OBJECT ID's | OBJECT COLLECTION | DATA FLOW COLLECTION |
|---|---|---|---|
| Exten. Set 1 | Object 1<br>Object 2 | Object Coll. 1 | Data Flow Coll. 1 |
| Exten. Set 2 | Object 4 | Object Coll. 2 | Data Flow Coll. 2 |
| ... | ... | ... | ... |
| Exten. Set N | Data Type N | Object Coll. N | Data Flow Coll. N |

EXTENDING DATA FLOWS

BACKGROUND

This disclosure relates to extending data flows in a data processing environment.

Simple data types, also referred to as "primitive" and "elementary" data types, cannot be broken down into smaller component data types. In general, simple data types are the basic data types that are predefined in a language for authoring machine-readable instructions. Simple data types include, e.g., character, numeric, string, and Boolean data types. Simple types do not have element content and do not carry attributes.

Complex data types, also referred to as "composite data types" and "data structures," are assemblies of simple data types. Complex data types can also include other complex data types in the assembly. In general, complex data types are defined by a user to fit the operational context of a particular set of machine-readable instructions (e.g., of a particular program or a particular set of programs). Complex data types include data objects, records, arrays, tables, and the like.

Complex data types can be defined by a user who assembles a set of elements, fields, and/or attributes to form a reusable data structure. Each of these has a type and, as discussed above, hierarchical and recursive complex data types that are themselves assembled from complex data types can be formed. Such definition is generally done prior to deployment of a set of machine-readable instructions, e.g., by a software company before software installation by a customer.

Business objects are abstractions of entities in a business domain. Such entities are generally associated with specific information and participate in specific activities in the business domain. These information and activities can be reflected in the definitions of complex data types in a data processing environment that embody the business objects. For example, a single object data type can encapsulate all of the data and behavior associated with the abstracted entity, although this is not necessarily the case.

Complex data objects can also be used to characterize other abstractions from the business domain or from the data processing activities that are performed in accordance with machine-readable instructions. For example, an interface object can be used to characterize a particular user interface, such as a selection screen or the like. As another example, database objects can be used to characterize particular aspects of a relational database, such as tables, rows, and/or columns in a database.

SUMMARY

The inventors have recognized that complex data types, abstractions represented by complex data types, and data flows can be extended by adding one or more additional elements or attributes after a set of machine-readable instructions has been deployed. Such extensibility allows a set of machine-readable instructions to be further tailored to an operational context. For example, a customer who purchases a set of software from software company can tailor the set of software to the customer's own operations. As another example, a software company can tailor a generic set of software to the needs of a particular industry and then sell the tailored software to companies in that industry.

Systems and techniques for extending data flows are thus described. In one aspect, an article includes one or more machine-readable media storing instructions operable to cause one or more machines to perform operations. The operations can include receiving extension information identifying an extension of a first object in a data processing system landscape, accessing data flow information to identify one or more data flows that involve the first object, and extending, on the basis of identifying the one or more data flows as involving the first object, at least some of the one or more data flows so that information in the extension is conveyed between instances of the first object and instances of a second object during data processing in the data processing system landscape. The identified data flows convey stored information from one object to another.

This and other aspects can include one or more of the following features. In extending at least some of the one or more data flows, the extension of the first object can be mapped to a particular attribute in the second object. The operation can also include conveying information from the extension of a first instance of the first object to a second instance of the second object in accordance with an extended data flow. The information can be conveyed from the extension to the second instance by generating a message to convey information from the first instance of the first object to the second instance of the second object.

The message can convey the information across a boundary between logical collections of machine-readable instructions in the data processing system landscape. Data flow information can be accessed in a data flow registry that identifies a source data object and a target data object in one or more data flows. The data flow information can be accessed to identify one or more second objects that are involved in the one or more data flows that involve the first object. The one or more second objects can be extended based at least in part on their identification in the data flow information. The data flow information can include an extension set that associates a collection of object identifiers, the object identifiers identifying objects in a data processing system landscape and a collection of data flow identifiers, the data flow identifiers identifying data flows in the data processing system landscape that involve the objects identified by the object identifiers. Extending at least some of the one or more data flows can include extending the objects identified in the collection of object identifiers without input from a user and extending the data flows identified in the collection of data flow identifiers without input from a user.

In another aspect, a method includes receiving attribute information describing a first additional attribute that is to be added to a first object in an installed data processing system landscape, based at least in part on the attribute information, adding a second additional attribute to a second object in the data processing system landscape, storing a description of a data flow between the first object and the second object, and, during subsequent operational data processing activities in the data processing system landscape, accessing the data flow description and conveying information from the first additional attribute of an instance of the first object to the second additional attribute of an instance of the second object in accordance with the data flow description. The description reflects the first additional attribute and the second additional attribute.

This and other aspects can include one or more of the following features. In accessing the data flow description a conveyance of information from the first additional attribute to the second additional attribute can be mapped at an attribute-level to generate attribute mapping information.

The second additional attribute can be added to the second data object by accessing a data flow registry that identifies a conveyance of information between the first object and the second object during operational data processing activities in the data processing system landscape, and adding the second additional attribute based at least in part on the identification of the conveyance in the data flow registry. The information from the first additional attribute of the instance of the first object can be conveyed to the second additional attribute of the instance of the second object by generating a message that includes the information. The message can be generated by accessing the data flow description that reflects the addition of the first additional attribute to the first object and generating the message having a message structure that is mapped to reflect the addition of the first additional attribute to the first object.

The information from the first additional attribute of the instance of the first object can be conveyed to the second attribute of the instance of the second object by receiving a message having a message structure that is mapped to reflect the addition of the first additional attribute to the first object, accessing the data flow description that reflects the addition of the first additional attribute to the first object, and conveying the information from the first additional attribute of the instance of the first object to the second attribute of the instance of the second object in accordance with the data flow description.

The data flow description can be stored by storing a rule for conveying information from the first additional attribute of an instance of the first object to the second attribute of an instance of the second object. The first object and the second object need not be not involved in a same data flow but rather the information can be conveyed from the first additional attribute to the second attribute over a third object.

In another aspect, a memory includes an extension set data assembly stored in the memory. The extension set data assembly associates a collection of object identifiers and a collection of data flow identifiers. The object identifiers identify objects in a data processing system landscape that can be extended upon an extension to an object in the data processing system landscape to meet the requirements of a business scenario. The data flow identifiers identify data flows in the data processing system landscape that involve the objects identified by the object identifiers and that can be extended to meet the requirements of the business scenario. The memory can be for storing data for access by operations performed by a data processing system.

This and other aspects can include one or more of the following features. The extension set data assembly can associate an identifier of one or more originating objects in which the extension originates. The extension set data assembly can associate multiple identifiers of originating objects in which the extension originates.

The details of one or more implementations are set forth in the accompanying drawings and the description below. Other features and advantages will be apparent from the description and drawings, and from the claims.

DESCRIPTION OF DRAWINGS

FIG. 3 schematically illustrates an example collection of mapping information.

FIG. 4 shows a system for extending data flows between objects.

FIG. 7 shows an example user interface over which a system can receive information describing the nature of an extension of a first data object.

FIG. 15 shows an example user interface over which a system can receive a selection of an extension set.

FIG. 16 schematically illustrates an example collection of extension sets in a extension set table.

Like reference symbols in the various drawings indicate like elements.

DETAILED DESCRIPTION

Figure 1:
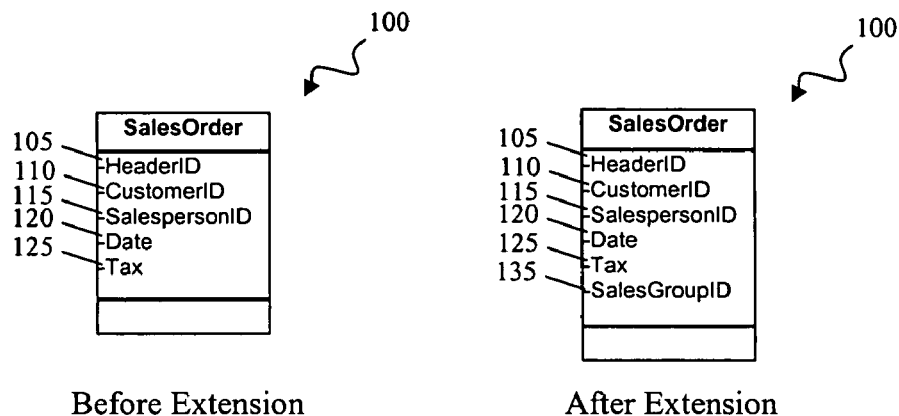
FIG. 1 schematically illustrates an extension of an object.

FIG. 1 schematically illustrates an extension of an object 100. Object 100 is a "sales order object" and can be an abstraction of a "sales order entity" in a business domain. Object 100 can also be a data type. Object 100 includes a collection of attributes 105, 110, 115, 120, 125. Attributes 105, 110, 115, 120, 125 were assembled prior to deployment of object type 100. For example, attributes 105, 110, 115, 120, 125 could have been assembled by a software company before the installation of software that uses object 100 by a customer.

After the extension of object 100, object 100 includes an additional attribute 135. Attribute 135 can tailor object 100 to a specific operational context, such as that found at an installation for an individual customer. Moreover, the extension of object 100 can occur after the software that uses object 100 has been installed and is operational. After extension, object 100 remains a "sales order object" and can remain an abstraction of sales order entities in a business domain. Object 100 is identified in a data processing system using the same identifier(s) before and after extension.

Figure 2:
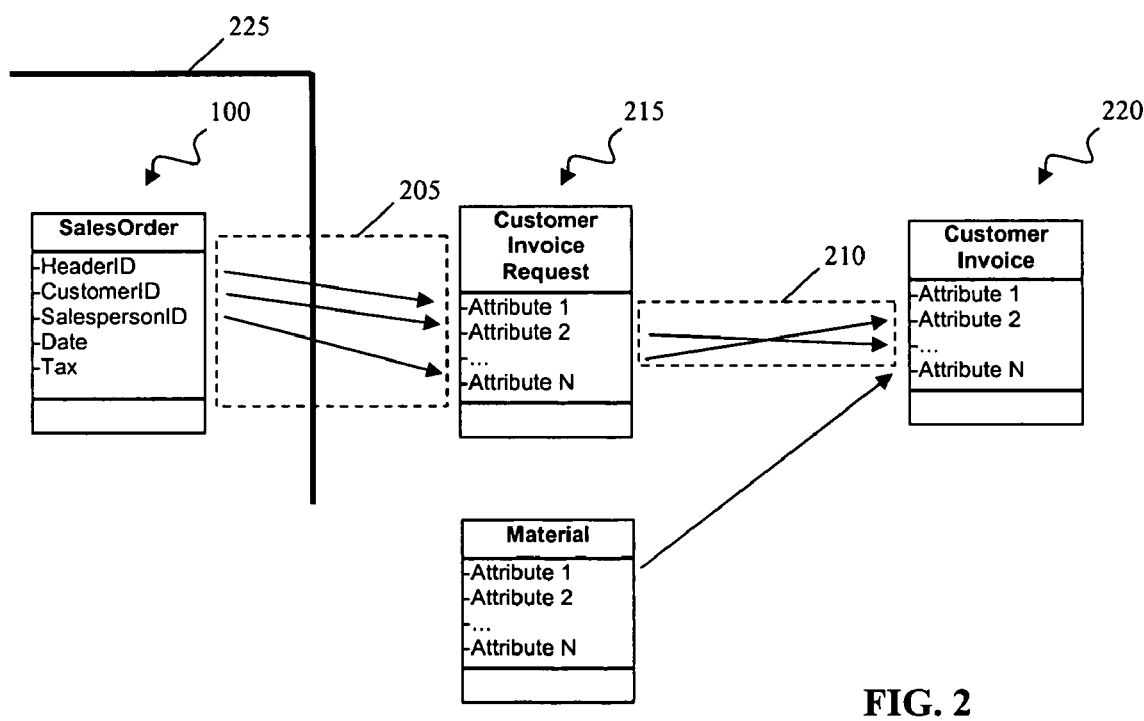
FIG. 2 is a schematic representation of data flows between objects.

FIG. 2 is a schematic representation of data flows 205, 210 between objects. Data flows are the conveyance of stored information from one complex data type or abstraction in a data processing environment to a second complex data type or abstraction. The conveyance of information in a data flow generally involves the assignment of one attribute value in a first complex data type or abstraction to an attribute of a second complex data type or abstraction. However, other categories of data flows are possible. For example, multiple attribute values can be combined and/or attribute values can be otherwise manipulated for assignment to an attribute of the second complex data type or abstraction.

In FIG. 2, data flow 205 conveys information from a source sales order object 100 to a target customer invoice request object 215. Data flow 210 conveys information from source customer invoice request object 215 to a target customer invoice object 220. The arrows encompassed by data flows 205, 210 represent the attribute-level assignment of information from source to target objects. As illustrated, not every value in a source object need be conveyed to a target object, nor does every value assigned to a target object need be received from a single source object. For example, values can be conveyed from multiple source objects to a single target object and/or values can be derived or otherwise determined by data processing activities during conveyance.

Data flows can convey information between complex data types and abstractions that reside in a single application or between complex data types and abstractions that reside in multiple applications, multiple logic units, and/or multiple data processing systems. For purposes of illustration, data flow 205 is shown as crossing a boundary 225 between sales order object 100 and customer invoice request object 215. Boundary 225 can represent a demarcation between different applications, different modules, and/or different deployment units in a data processing system landscape. Boundary 225 can also represent a boundary between different data processing system landscapes.

In a data processing system, data flows can be implemented using a collection of mapping information that provides details regarding the conveyance of information from one complex data type or abstraction to another. FIG. 3 schematically illustrates an example collection of mapping information in a mapping table 300. Mapping table 300 includes a source attribute column 305 and a target attribute column 310. Source attribute column 305 identifies a collection of attributes in a source complex data type or abstraction. Target attribute column 310 identifies a collection of attributes in a target complex data type or abstraction. Individual attributes in the source and target are associated with one another in rows 315 to indicate which values from the source attributes are to be assigned to which target attributes. Mapping table 300 can be identified using a mapping table identifier 320. In some implementations, the table identifier can identify that mapping table 300 is associated with a specific data flow.

Mapping information can be collected in ways other than a data table. For example, other data structures such as lists, records, arrays, objects, and the like can be used. As another example, mapping information can be collected in rules for conveying information from one complex data type or abstraction to another.

As discussed further below, mapping information can be used in a variety of different ways to implement a data flow. For example, mapping information can be accessed by a message-generating agent that creates a message that embodies the conveyance of information from a first data type to a second data type. As another example, mapping information can be accessed during the instantiation of a data type to assign appropriate values to the attributes of the new instance.

FIG. 4 shows a system 400 for extending data flows between complex data types and abstractions. System 400 includes a set of machine-readable instructions 405 for performing data processing activities on one or more data processing devices. The instructions of machine-readable instruction set 405 can be found in one or more applications, modules, functional units, logical units, and/or data processing system landscapes. The performance of data processing activities in accordance with the logic of instruction set 405 can result in the coordinated exchange of information between subsets of instructions directed to the performance of the specific aspects of the data processing activities. For purposes of convenience, subsets of instructions that are directed to the performance of specific aspects of the data processing activities are referred to herein as "logic." Thus, "logic" can be individual applications, modules, systems, or components of such instruction sets.

Machine-readable instruction set 405 can include user interface logic 415, extension logic 420, and extension infrastructure logic 425. The instructions of user interface logic 415 allow one or more data processing devices to interact with a user by inputting and outputting information. The interaction can be directed to the extension of a complex data type or the extension of an abstraction.

The instructions of extension logic 420 allow one or more data processing devices to extend data types and/or abstractions. For example, a data type or an abstraction can be extended as illustrated in FIG. 1.

The instructions of extension infrastructure logic 425 allow one or more data processing devices to extend data flows. Such extended data flows allow information found in an extension to be conveyed between one or more extended data types or abstractions. As discussed further below, extension infrastructure logic can be invoked by a unitary set of instructions dedicated to communication, such as a message-generating agent. Alternatively, extension infrastructure logic can be invoked by a component of a larger set of instructions for purposes that include communication in the set of data processing activities.

In addition to instruction set 405, system 400 also includes data repositories that store information relevant to the data processing activities performed in accordance with instruction set 405. For example, system 400 can include an enterprise services information repository 410 and a data flow information repository 415. Enterprise services information repository 410 stores information regarding the definitions of aspects of the data processing activities in system 400. At least some of the aspects in enterprise services information repository 410 can be extensible. For example, enterprise services information repository 410 can include a collection of complex data type definitions 430, a collection of business object definitions 432, a collection of interface definitions 434, and/or a collection of other definitions 436. Enterprise services information repository 410 can be a library such as the Enterprise Services Repository (ESR) of SAP NetWeaver (SAP AG, Walldorf, Germany).

Data type definitions 430 can include an identifier of various complex data types in system 400, the attributes of the identified types, and metadata regarding the identified types and their attributes. For example, such metadata can specify the characteristics, including the data type, of the attributes of a complex data type.

Business object definitions 432 can include an identifier of various business objects in system 400, information and activities associated with each of the identified business objects, and metadata regarding the identified business objects. Interface definitions 434 can include an identifier of various interfaces that can be rendered by system 400 during the course of data processing activities, along with a description of characteristics of the rendition. For example, interface definitions 434 can identify information and activities that are accessed during the rendition of a user interface.

Other definitions 436 can identify and characterize other service objects in system 400. For example, other definitions 436 can identify and characterize service interfaces (including associated operations, message types, and data types), process models, business scenario objects, and business process objects, and mapping objects in system 400.

Data flow information repository 415 stores information regarding the data flows in system 400. For example, data flow repository 415 can include a registry of data flows 440 and a collection of data flow descriptions 445. Data flow registry 440 describes data flows in system 400. The description provided in data flow registry 440 can include the complex data types and/or abstractions involved in each data flow. For example, data flow registry 440 can identify a data flow and source and target objects involved in the data flow by name or other identifier. The information in data flow registry 440 can be stored in a single database or other data structure, in associated data structures, or in separate data structures.

Data flow description collection 445 provides additional descriptive information regarding each data flow. For example, as discussed further below, the descriptions in data flow collection 445 can include information that provides details regarding the conveyance of information to and from the additional attributes in extended complex data types and abstractions. Such details can include rules for determining how additional attributes are mapped. The information in data flow description collection 445 can be stored in a single database or other data structure, in associated data structures, or in separate data structures.

Figures 5, 6:
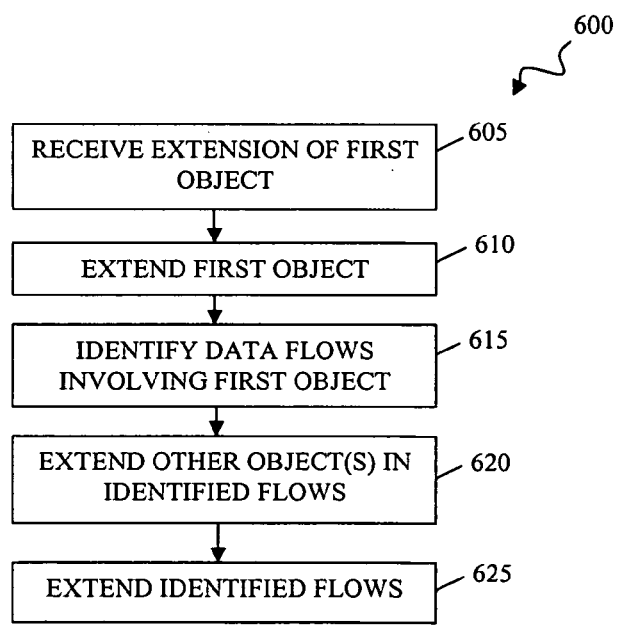
FIG. 5 is a schematic representation of an example data flow registry.
FIG. 6 is a flowchart of a process for extending data flows between objects.

FIG. 5 is a schematic representation of an example data flow registry, namely, a data flow registry 500. Data flow registry table 500 includes a data flow identifier column 505, a source identifier column 510, a source description column 515, a target identifier column 520, and a target description column 525.

Data flow identifier column 505 includes a collection of identifiers of data flows in a system. The data flow identifiers can be unique identifiers in that each identifier only identifies a single data flow in the system. Source identifier column 510 includes information identifying a source data type or abstraction. For example, source identifier column 510 can include a proxy data type of the source. Source description column 515 includes information describing the source data type or abstraction. The source description information can be formatted to be conveniently understood by a human. Target identifier column 520 includes information identifying a target data type or abstraction. For example, target identifier column 520 can include a proxy data type of the target. Target description column 525 includes information describing the target data type or abstraction. The target description information can be formatted to be conveniently understood by a human. Individual data flow identifiers, source identifiers, source descriptions, target identifiers, and target descriptions are associated with one another in rows 530 to describe the data flows in a system.

A data flow registry can be formed using structures other than a data table. For example, other data structures such as lists, records, arrays, and the like can be used. As another example, a data flow registry can be collected in rules for identifying the data flows in a system.

FIG. 6 is a flowchart of a process 600 for extending data flows between complex data types and/or abstractions which, for the sake of convenience, are referred to as "objects." Process 600 can be performed by one or more data processing systems in accordance with the logic of machine-readable instructions. For example, process 600 can be performed in accordance with extension logic 420 and extension infrastructure logic 425 (FIG. 4).

The system performing process 600 can receive information describing the desired extension of a first object at 605. The information can identify the object to be extended and the nature of the extension. The information can be received from another data processing system and/or over a user interface. The user interface can be implemented in accordance with the logic of a set of machine-readable instructions, such as user interface logic 415. The user interface can be implemented using one or more input devices and/or one or more output devices.

FIG. 7 shows an example user interface, namely, a display 700, over which a system can receive information describing the nature of an extension of a first object. Display 700 is a "create attribute" screen adapted to receive user input regarding the nature of an attribute that is to be added to an object that has been previously identified. Display shot 700 includes text 702 describing the previously identified object, along with a text information input region 705, a type information input region 710, a help information input region 715, and an additional information input region 720. Text information input region 705 includes input fields where a user can specify text that is to be associated with an attribute that is to be added. For example, text information input region 705 can include input fields for specifying a heading of an attribute that is to be added, a label for the attribute, and a tool tip for providing a description of the attribute.

Type information input region 710 includes input fields where the user can specify the data type of the attribute that is to be added. For example, type information input region 710 can include input fields for specifying a data type of the attribute that is to be added, the length of the data type, and any decimal places that are permitted in the data type. Help information input region 715 includes input fields where the user can specify help information to be associated with the attribute to be added, and additional information input region 720 includes input fields where the user can specify additional information that is associated with the attribute to be added, such as the default value of the attribute. Display 700 also includes command buttons 725, 730 by which a user can direct that the specified information be saved or discarded.

Returning to FIG. 6, the system performing process 600 can extend the first object at 610. The first object can be extended by adding an attribute in accordance with the information received at 605.

The system performing process 600 can also identify data flows that involve the first object at 615. Such data flows can be identified, e.g., by accessing a registry of data flows and searching for data flows in which the first object acts as a source or a target object. For example, data flow registry 500 (FIG. 5) can be searched to locate identifiers in columns 510, 520 that identify the first object.

The system performing process 600 can also extend other objects involved in data flows that involve the first object at 620, along with the data flows themselves at 625. The extension of a data flow can include changing data flow registry or other information that provides details regarding the conveyance of information from one object to another.

Figure 8:
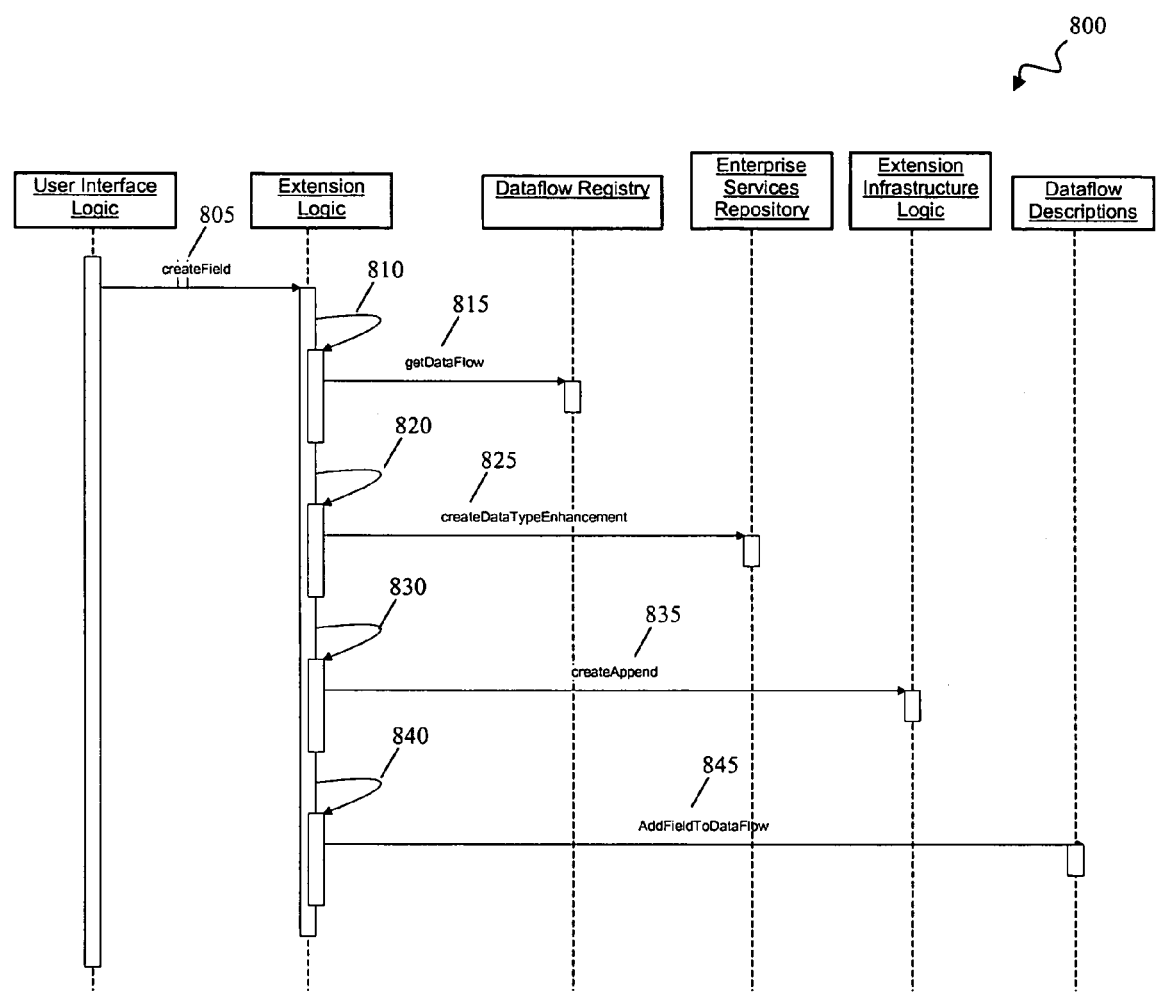
FIG. 8 schematically illustrates how the mapping table of FIG. 3 can be changed to extend a data flow between a source object and a target object.

FIG. 8 is a schematic representation of one implementation of process 600 (FIG. 6), namely a process 800. Process 800 occurs in response to the receipt of a description of a desired extension over an interface. The interface can convey the description of the desired extension, along with a request to implement the extension, to extension logic at 805. To implement the extension, extension logic can perform various data processing activities.

For example, extension logic can perform operations to identify one or more data flows and one or more objects that are to be extended at 810. These operations can include obtaining the identities of one or more data flows that involve the object to be extended from the data flow registry at 815. In identifying data flows, extension logic can also identify other objects that are themselves involved in the data flows and that should be extended but were not identified in the description of a desired extension received from the user interface.

Extension logic can also perform operations to extend any such objects that are involved in the identified data flows at 820. These operations can include adding new attributes to the objects by changing the definitions of the objects stored in the enterprise services repository at 825.

Extension logic can also perform operations to change the handling of data flows that are extended during subsequent data processing activities at 830. These operations can include causing the extension infrastructure logic to convey the additional data along the data flows when the data flows are performed at 835. Extension logic can cause the extension infrastructure logic to convey the additional data, e.g., by triggering the performance of certain data processing activities by the extension infrastructure logic.

Extension logic can also perform operations to change the description of data flows that are relied upon by the extension infrastructure logic at 840. These operations can include changing the descriptions of one or more data flows at 845. The changes can describe the mapping of the additional attributes in the extended objects.

Figure 9:
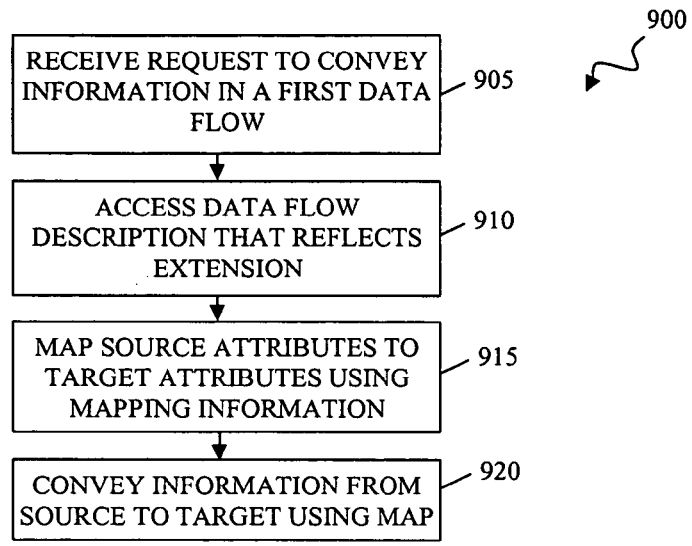
FIG. 9 is a flow chart of a process for conveying information between extended objects using an extended data flow.

FIG. 9 is a flow chart of a process 900 for conveying information between extended data objects using an extended data flow. Process 900 can be performed by one or more data processing systems in accordance with the logic of machine-readable instructions. For example, process 900 can be performed in accordance with extension infrastructure logic 425 and/or data flow descriptions 445 (FIG. 4).

The system performing process 900 can receive a request to convey information in a first data flow at 905. The request can be a part of other data processing activities or the request can be a stand-alone activity. For example, the request can be a procedure or function call to a group of communication instructions. The request can identify the data flow by an identifier, or the data flow can be derived, e.g., based on other content of the request.

The system performing process 900 can access mapping information that reflects the extension of one or more objects at 910. For example, once a data flow is identified, attribute-level mapping information for the data flow can be derived using rules or retrieved from a data table or other store. The mapping information can reflect the extension of one or more objects in that an object involved in the data flow has been extended and that information is to be conveyed from the additional attribute or into the additional attribute. The extension can have been performed, e.g., by a customer after installation of software.

The system performing process 900 can map the source attributes to target attributes using the mapping information that reflects the extension at 915 and then convey information from the source object to the target object using the map at 920. This extended data flow will thus accommodate the extension of data object(s) in a data processing system landscape.

Figure 10:
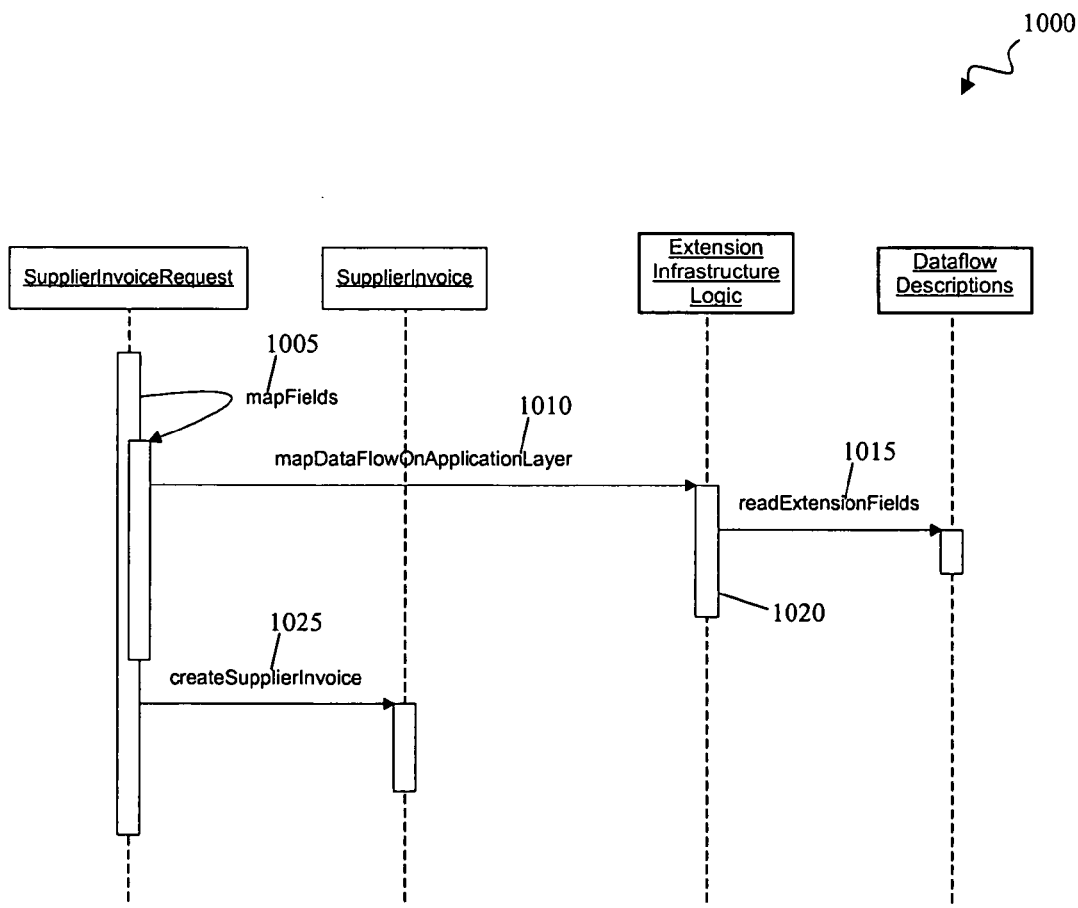
FIG. 10 is a schematic representation of one implementation of the process of FIG. 9.

FIG. 10 is a schematic representation of one implementation of process 900 (FIG. 9), namely a process 1000. Process 1000 is a set of data processing activities that responds to a request for an extended supplier invoice object (i.e., "SupplierInvoiceRequest"). The activities performed in response to a supplier invoice request can include a mapping of the attributes of a source object to a supplier invoice object at 1005. This mapping can include accessing mapping information for attributes that were assembled in the objects prior to deployment. This mapping information can be accessed from a mapping table, such as table 300 (FIG. 3). This mapping can also include requesting a mapping of the extension attributes from the extension infrastructure logic at 1010. In response to the request, extension infrastructure logic can read a description of the extension fields for a particular dataflow from a collection of dataflow descriptions at 1015. With this information, extension infrastructure logic can directly map extension attributes to the supplier invoice object that is being created at 1020. Such a direct mapping can include conveying populating the additional attributes of the supplier invoice object this is being created with data drawn from a source object. In another implementation, extension infrastructure logic can request that an API or other set of data processing activities be performed to directly map extension attributes to the supplier invoice object that is being created at 1020 using information stored with the dataflow descriptions. Further, the supplier invoice object can be created at 1025 and other fields can be populated as they would in the absence of an extension. For example, mapping information such as found in table 300 (FIG. 3) can be used to populate the fields of a newly created object.

Figure 11:
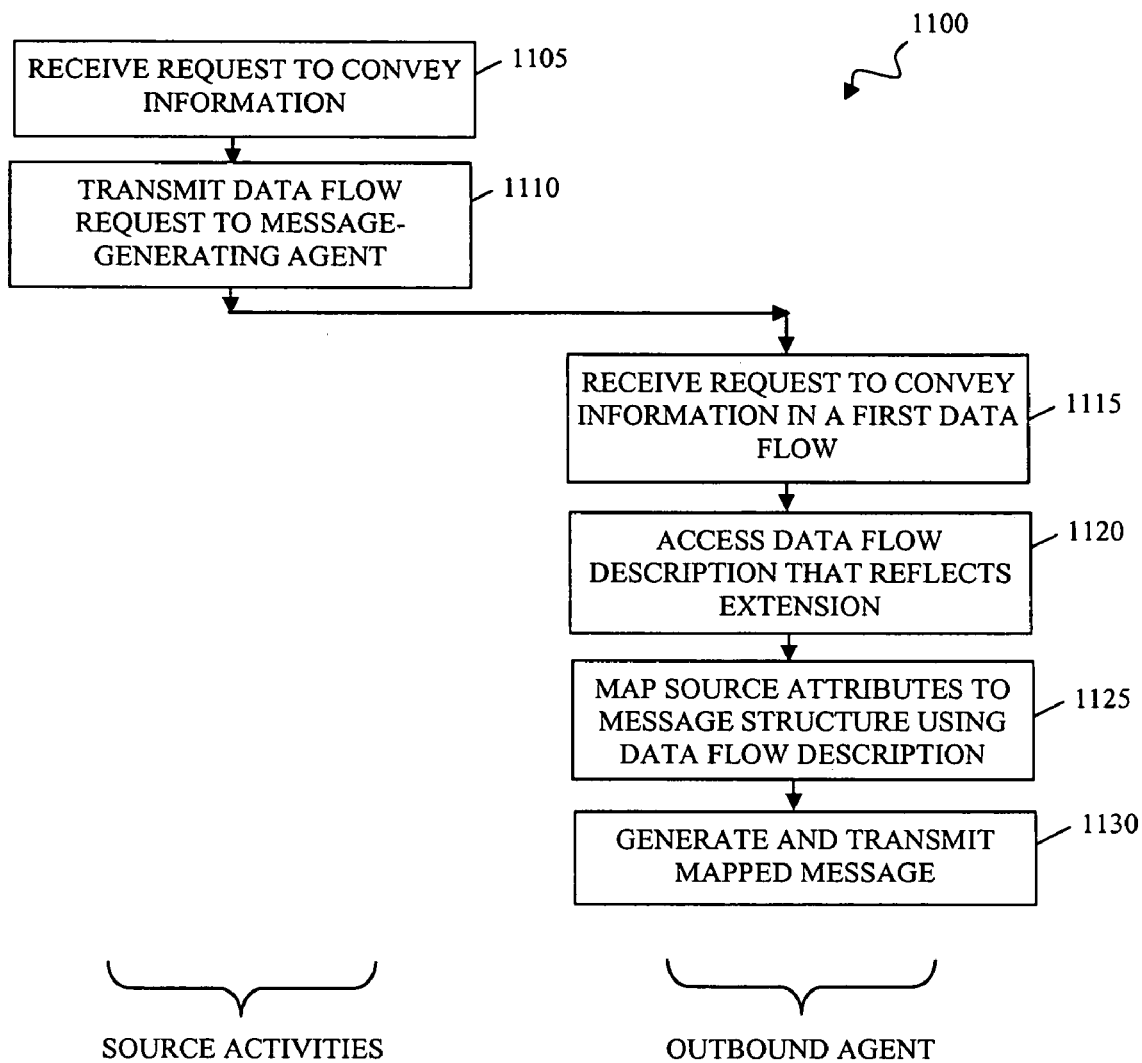
FIG. 11 is a flow chart of a process for generating a message that conveys information between extended objects using an extended data flow.

FIG. 11 is a flow chart of a process 1100 for generating a message that conveys information between extended data objects using an extended data flow. Process 1100 can be performed by one or more data processing systems in accordance with the logic of machine-readable instructions. For example, process 1100 can be performed in accordance with extension infrastructure logic 425 (FIG. 4). Process 1100 can be performed when conveying information across a boundary between different applications, different modules, and/or different deployment units in a data processing system landscape. Process 1100 can also be performed when conveying information between different data processing system landscapes. Activities in process 1100 can be performed in accordance with different groups of machine-readable instructions, as discussed further below.

The system performing process 1100 can receive a request to convey information at 1105. The receipt of the request can be a part of a set of data processing activities, referred to in FIG. 11 as "source activities." For example, the request can be a procedure or function call to a group of communication instructions. In some implementations, the received request can identify a specific data flow that is desired. Alternatively, the identity of a data flow can be derived, e.g., based on other content of the request.

The system performing process 1100 can transmit a request for a data flow to a message-generating agent at 1110. The transmittal of the request for a data flow can be a part of the source data processing activities. The request for a data flow can identify the desired data flow by name or other identifier, or the identity of data flow can be derived, e.g., based on other content of the request for the data flow. In some implementations, the request for a data flow can include the information that is to be conveyed in the data flow. Alternatively, the recipient message-generating agent can retrieve the information to be conveyed from other sources.

The system performing process 1100 can receive the request for the data flow at 1115. The receipt of the request for the data flow can be a part of a set of data processing activities, referred to in FIG. 1 as "outbound agent" activities. The request for the data flow can identify the desired data flow by an identifier or the data flow can be derived, e.g., based on other content of the request.

The system performing process 1100 can access a description of the data flow that reflects the extension of one or more objects at 1120. For example, once a data flow is identified, a description of the data flow that reflects attribute-level mapping information can be retrieved. As another example, attribute-level mapping information for the data flow can be derived using rules. The access of mapping information can be a part of the outbound agent data processing activities.

The system performing process 1100 can map the source attributes to the structure of a message using the data flow description that reflects the extension at 1125. For example, any additional attributes can be mapped to message fields allocated for such extensions. As another example, the structure of the message can itself be extended in a ordered way so that the extension is identifiable in the message. The mapping of source attributes to the structure of a message can be a part of the outbound agent data processing activities.

The system performing process 1100 can then generate and transmit the mapped message, which includes extension information, from the outbound message agent to an inbound message agent at 1130. The generation and transmittal of the mapped message can be a part of the outbound agent data processing activities.

Since the inbound message agent and the outbound message agents can be separated by a boundary of one type or another, the handling of the message by the inbound message agent is discussed in connection with FIG. 12. However, the inbound message agent and the outbound message agents need not be in separate systems or separated by a boundary.

Figure 12:
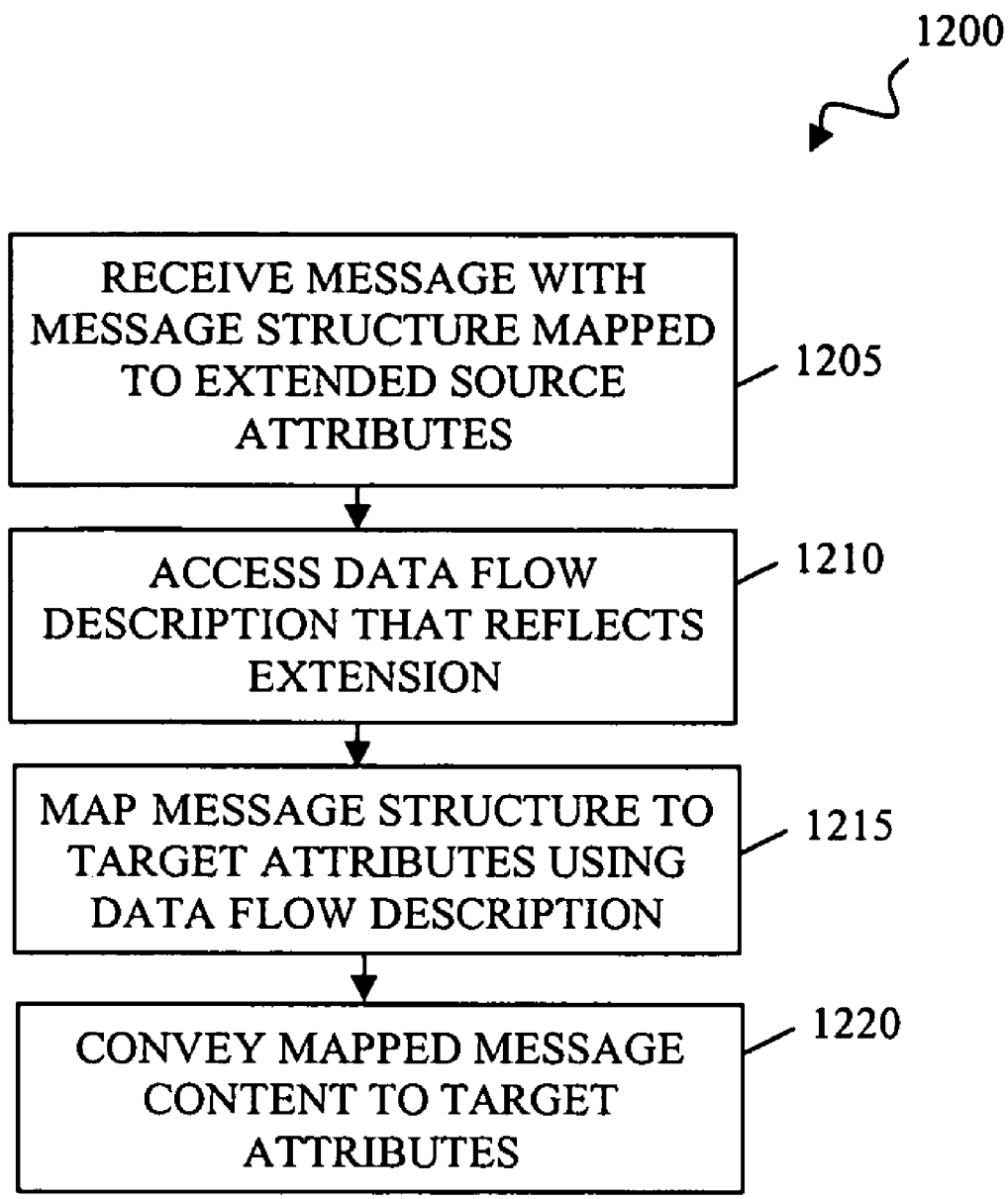
FIG. 12 is a flow chart of a process for receiving a data flow message that conveys information between extended objects.

FIG. 12 is a flow chart of a process 1200 for receiving a data flow message that conveys information between extended data objects. Process 1200 can be performed by one or more data processing systems in accordance with the logic of machine-readable instructions. For example, process 1200 can be performed in accordance with extension infrastructure logic 425 (FIG. 4). Process 1200 can be performed when receiving information conveyed across a boundary between different applications, different modules, and/or different deployment units in a data processing system landscape. Process 1200 can also be performed when receiving information conveyed between different data processing system landscapes.

The system performing process 1200 can receive a message having a message structure that is mapped to extended source attributes at 1205. The receipt of such a message can be a part of a set of data processing activities associated with an inbound message agent.

The system performing process 1200 can access a data flow description that reflects the extension of one or more objects at 1210. For example, attribute-level mapping information for the message data flow can be derived using rules or retrieved from a data table or other store. The access of such mapping information can be a part of a set of data processing activities associated with an inbound message agent.

The system performing process 1200 can map the structure of the message to target attributes using the data flow description that reflects the extension at 1215. In particular, message fields can be mapped to additional target attributes in an extended target object. The mapping of the structure of the message to target attributes can be a part of a set of data processing activities associated with an inbound message agent.

The system performing process 1200 can then convey the mapped message content to appropriate target attributes at 1220. The conveyance of mapped message content to appropriate target attributes can be a part of a set of data processing activities associated with an inbound message agent or part of other data processing activities.

The extended, message-based data flow described in FIGS. 11 and 12 will thus accommodate the extension of data object(s) in one or more data processing system landscapes.

Figure 13:
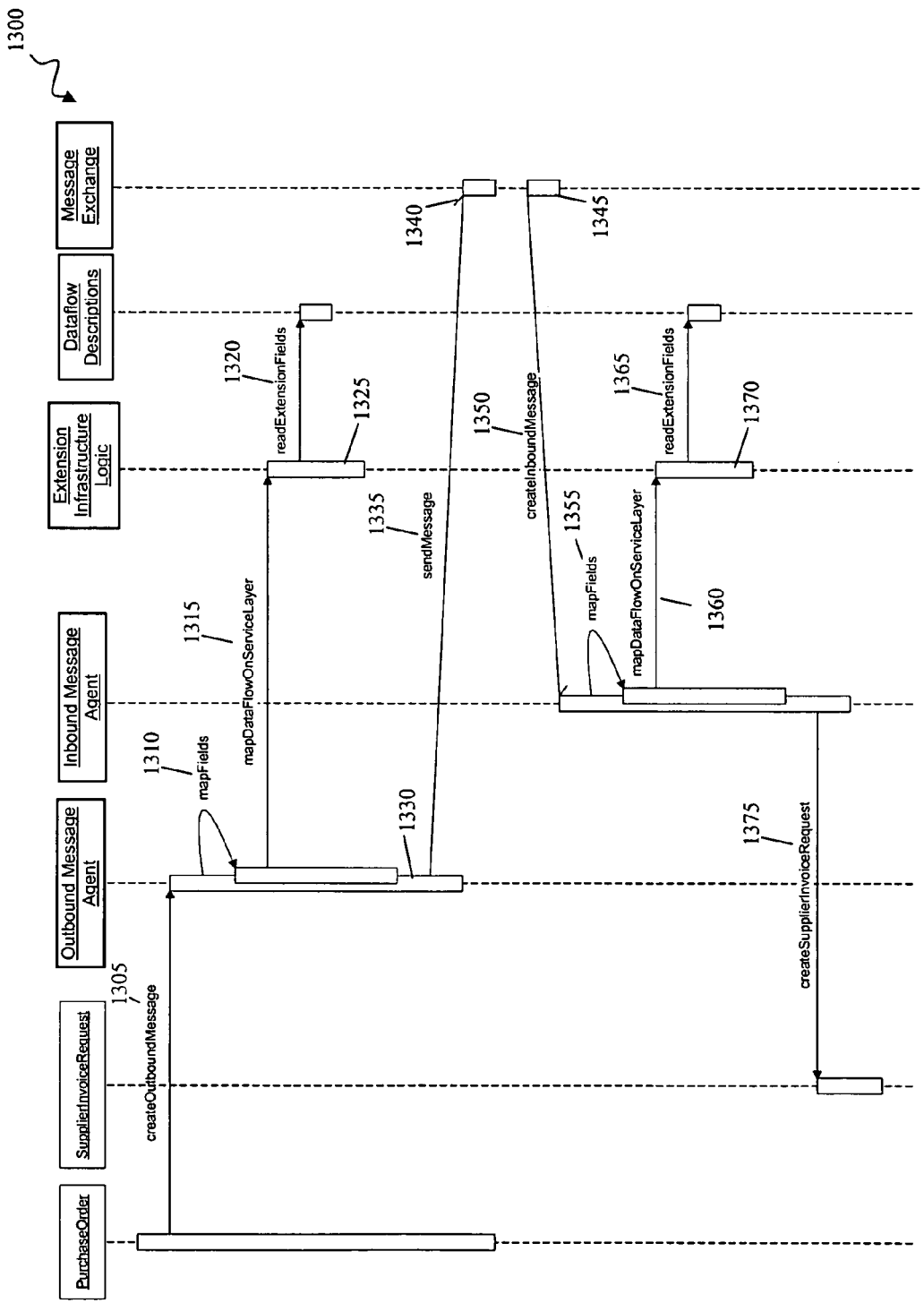
FIG. 13 is a schematic representation of one implementation of the processes of FIGS. 11 and 12.

FIG. 13 is a schematic representation of one implementation of processes 1100 and 1200 (FIGS. 11 and 12), namely a process 1300.

Process 1300 includes a set of data processing activities for conveying information from an extended purchase order to an extended supplier invoice request. To convey this information, process 1300 requests the creation of an outbound message from an outbound message agent at 1305. Outbound message agent maps the fields of the extended purchase order object to a message structure at 1310. This mapping can include requesting that the data flow on the service layer from the purchase order object to the extended message structure be mapped by extension infrastructure logic at 1315. In particular, extension infrastructure logic can read the extension fields from data flow descriptions at 1320 and can then directly map the additional attributes of the extended purchase order to the extended message at 1325. In another implementation, extension infrastructure logic can request that an API or other set of data processing activities be performed to directly map extension attributes to the extended message using information stored with the dataflow descriptions.

Further, the outbound message can be created by the outbound message agent at 1330 and other fields in the message can be populated as they would in the absence of an extension. For example, mapping information such as found in table 300 (FIG. 3) can be used to populate the fields of the message.

The populated message can be sent from outbound message agent to a message exchange at 1335. The message exchange can be, e.g., the SAP Exchange Infrastructure (XI). The inbound receipt of the message at the message exchange occurs at 1340 and the outbound transmittal of the message at the message exchange occurs at 1345. Receipt at 1340 and transmittal at 1345 can be asynchronous.

The receipt of the message by the message exchange can cause the creation of an inbound message at 1350. Once the inbound message is received at an inbound message agent, the inbound message agent can map the fields of the message structure to an extended supplier invoice request object at 1355. This mapping can include requesting that the data flow on the service layer from the extended message structure to the extended supplier invoice be mapped by extension infrastructure logic at 1360. In particular, extension infrastructure logic can read the extension fields from data flow descriptions at 1365 and can then directly map the additional attributes of the extended message structure to the extended supplier invoice at 1370. In another implementation, extension infrastructure logic can request that an API or other set of data processing activities be performed to directly map extension attributes to the extended supplier invoice using information stored with the dataflow descriptions.

The inbound message agent can also create an extended supplier invoice request at 1375. The extended supplier invoice request can include the additional attributes of the extended message structure and the extended purchase order object.

Figure 14:
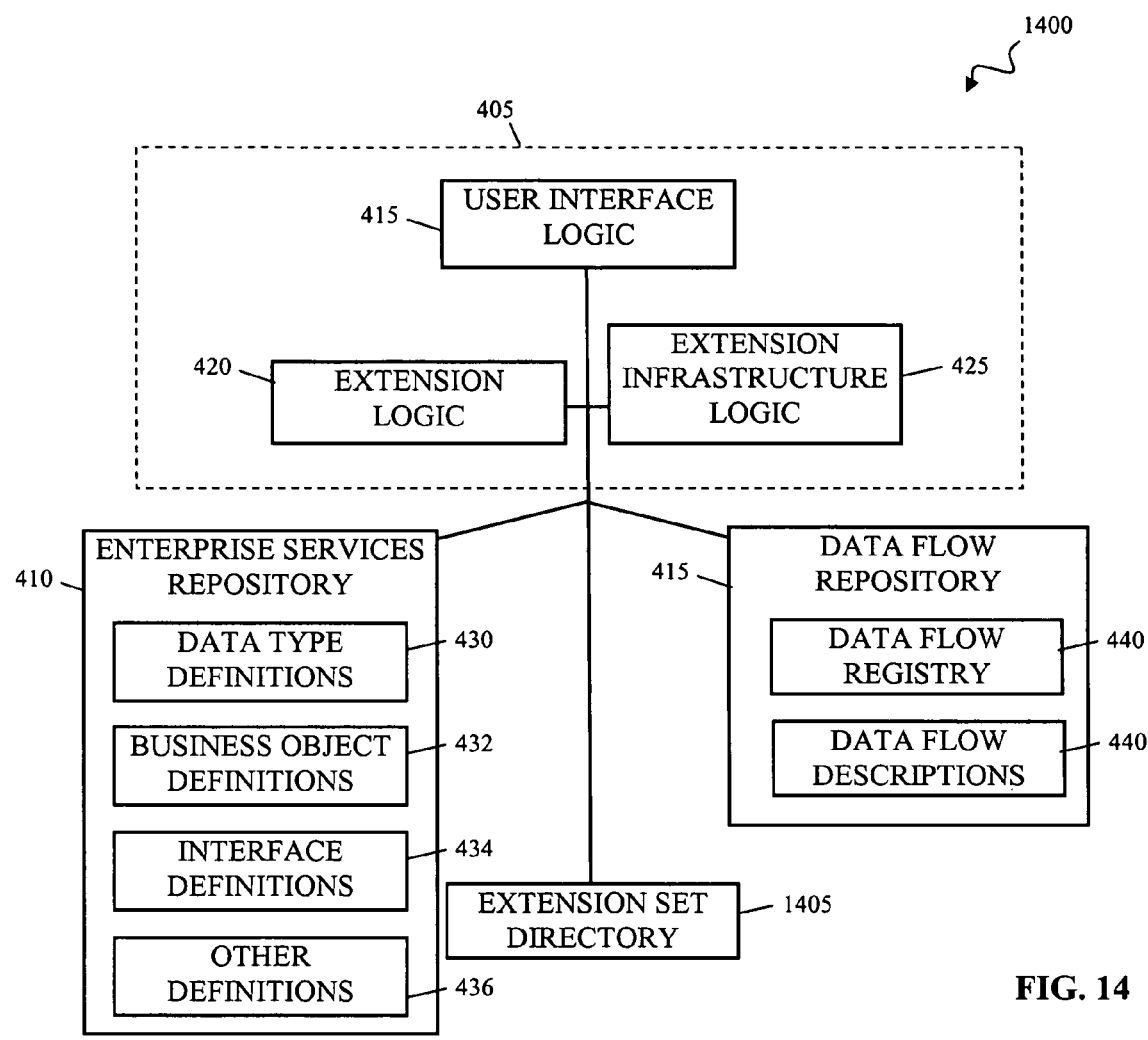
FIG. 14 shows a system for extending data flows between objects.

FIG. 14 shows a system 1400 for extending data flows between complex data types. In addition to a set of machine-readable instructions 405, enterprise services information repository 410, and data flow information repository 415, system 1400 also includes an extension set repository 1405.

Extension set repository 1405 stores a collection of extension sets. An extension set is a collection of extensible data flows that can be extended to meet the requirements of a business scenario. Extensible data flows are those that have the potential to be extended. Extensible data flows can be particularly demarcated in a data flow repository as extensible. Not every data flow need be extensible, but rather extensibility can be determined by a developer or other user based on the role of the data flow in the data processing activities.

The data flows in an extension set can be extended to meet the requirements of a business scenario. A business scenario is a set of interactions and events that arise during the real-world operations of a business. Example business scenarios include the sale of an item from stock, the quoting of a price in response to a request from a customer, and the design and development of a new product.

The requirements of a business scenario can reflect the business domain. By way of example, the sale of an item from stock can be different in different industries. In particular, in some industries, the date of manufacture of an item may be relevant to the sale of an item from stock, whereas in other industries the date of manufacture may be irrelevant. As yet another example, in some industries, regulatory or other approval may be required for the sale of an item, whereas in other industries regulatory or other approval is unnecessary.

By collecting the data flows in an extension set to meets the requirements of a business scenario, extensibility can be tailored to even specialized events and interactions that occur during the real-world operations of a business. For example, in some industries, a field that characterizes the date of manufacture of an item can be added to objects that are involved with the sale of an item from stock. An extension set can describe how the date of manufacture information is to be treated, i.e., how the date of manufacture is to be conveyed between different objects, how the date of manufacture is to be rendered on a computer display or a paper printout, and any impact that the date of manufacture is to have on other attributes.

In some implementations, the collection of data flows in an extension set can be predefined by a developer or other individual. For example, extension sets can be marketed and sold separately from the set of machine-readable instructions to which the extension set relates. In some implementations, extension sets can also be derived from process models. A process model is a description of a set of data processing activities that occur in response to a business scenario. The information for an extension set can thus be drawn from the description provided by a process model.

Since an extension set translates the data processing activities of a set of machine-readable instructions to a set of business scenarios, even a user with limited understanding of the operational details of those data processing activities can extend those activities. In this regard, FIG. 15 shows an example user interface, namely, a display 1500, over which even a user with limited understanding of the operational details of data processing activities can extend a first object and a select of one or more extension sets to meet the requirements of a business scenario. In addition to text 702, text information input region 705, type information input region 710, help information input region 715, and an additional information input region 720, and command buttons 725, 730, display 1500 also includes an extension set selection region 1505. Extension set selection region 1505 includes a list of extension sets 1510 (denoted as "extension scenarios") that involve the object identified by text 702. Extension sets in list 1510 can be selected using inputs 1515, 1520.

In operation, even a user with limited understanding of the operational details of data processing activities can extend those activities using display 1500. In particular, a user can identify an object that is to be extended and this identification can appear in text 702. The system can access a collection of extension sets and present extension sets that involve the identified object in extension set list 1510. A user can select an appropriate extension set based on a business scenario using inputs 1515, 1520. Based on the selected extension set, additional attributes can be added to multiple objects and data flows without the user even being aware of details regarding those objects or data flows. Rather, the user need only understand the business scenario in which the extension is involved.

FIG. 16 schematically illustrates an example directory of extension sets, namely, an extension set table 1600. Extension set table 1600 includes an extension set identifier column 1605, an originating object identifier column 1610, a collection of object identifiers column 1615, and a collection of data flow identifiers column 1620. Extension set identifier column 1605 identifies an extension set by name or other identifier. Originating object identifier column 1610 identifies one or more objects in which an extension that is relevant a particular extension set can originate. Such objects are also referred to as "hooks" and, as discussed above, can be data types, business objects, interfaces, messages, or the like. Multiple hooks may be relevant to the same single extension set because multiple hooks may be involved in the business scenario addressed by that business set. For example, an extension to a sales order object and an extension to a display of a sales order may involve the same business scenario. An extension can originate at a hook manually or automatically, i.e., without user input. For example, a hook can originate an extension when a user indicates that a new attribute is to be added to an object. As another example, a hook can originate an extension when an object is extended as a consequence of being involved in a data flow with an object that a user extends manually. Thus, extension sets can set forth an interconnected network of objects and data flows that are to be extended, and multiple extension sets can be invoked with a single manual extension of a data type.

Object identifier collection column 1615 includes a collection of information identifying objects that are to be extended when an extension set is selected. Data flow identifier collection column 1620 includes a collection of information identifying data flows that are to be extended when an extension set is selected. The information in object identifier collection column 1615 and data flow identifier collection column 1620 can be, e.g., linked lists of addresses or other data collections that need not have a uniform size.

The individual extension set identifiers, originating object identifiers, object identifier collections, and data flow identifier collections are associated with one another in rows 1625 to indicate which objects and data flows are to be automatically extended in the event that an extension set is selected. Extension set information can be collected in ways other than a data table. For example, other data structures such as lists, records, arrays, objects, and the like can be used. As another example, extension set information can be collected in rules.

Figure 17:
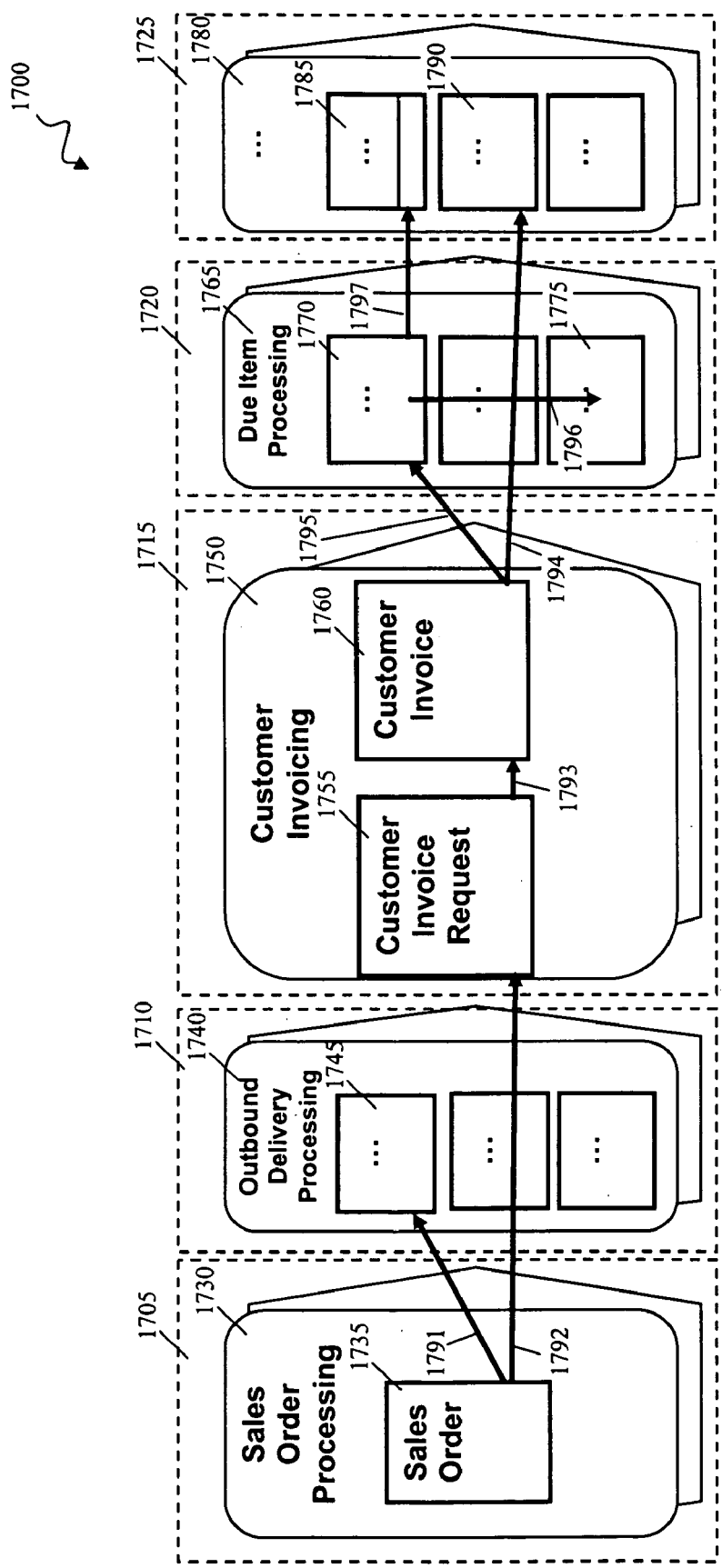
FIGS. 17-18 schematically illustrate the application of an extension set to the extension of a complex data type in a system landscape.
Figure 18:
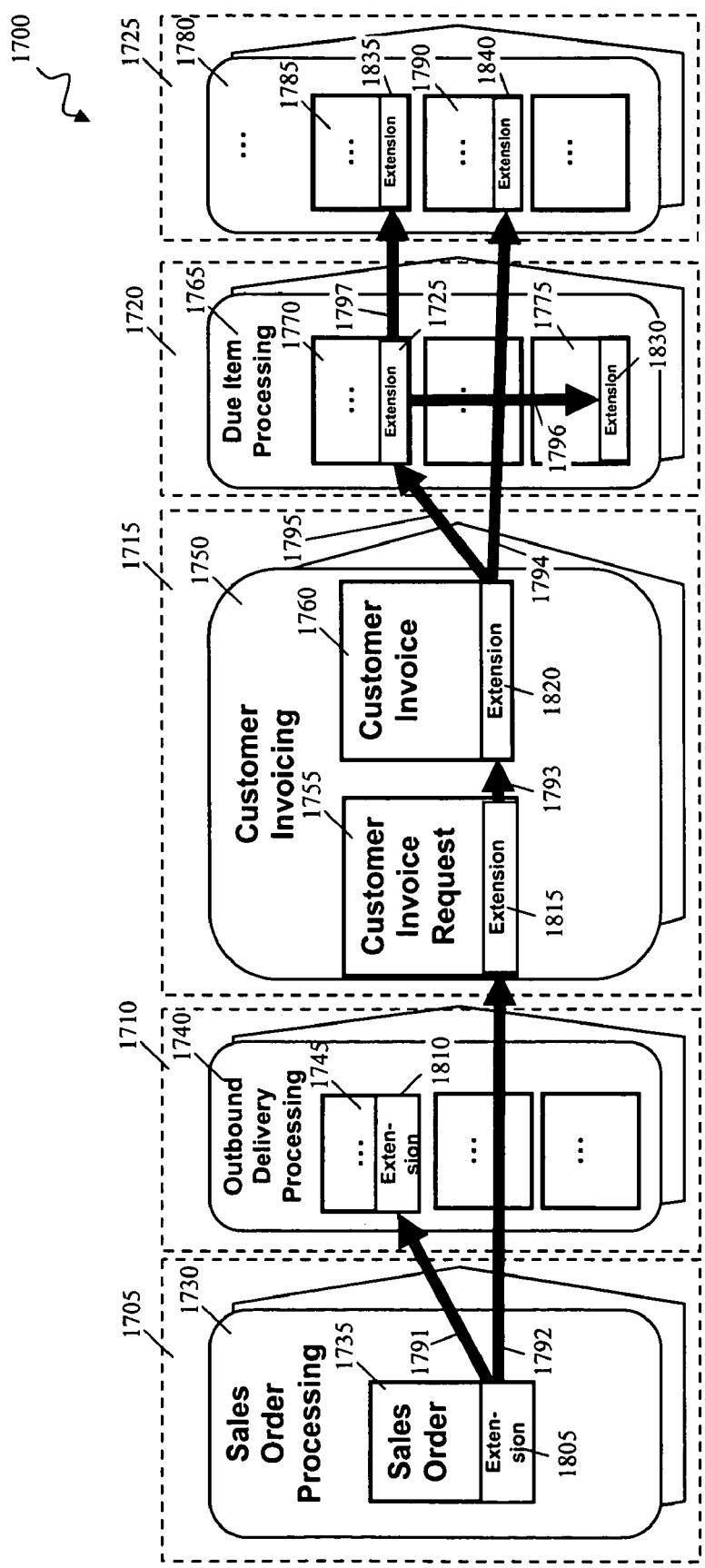

FIGS. 17-18 schematically illustrate the application of an extension set to the extension of a complex data type in a system landscape 1700. FIG. 17 shows system landscape 1700 before extension. Unextended system landscape 1700 includes demarcated sets of machine-readable instructions 1705, 1710, 1715, 1720, 1725. Sets 1705, 1710, 1715, 1720, 1725 are demarcated logically (e.g., according to function) or otherwise. For example, sets 1705, 1710, 1715, 1720, 1725 can represent individual deployment units of machine-readable instructions.

Instruction set 1705 includes data processing activities 1730 directed to the processing of a sales order. A sales order object 1735 is handled during activities 1730. Instruction set 1710 includes data processing activities 1740 directed to the outbound delivery processing of a sales order. Objects 1745, . . . are handled during activities 1740.

Instruction set 1715 includes data processing activities 1750 directed to customer invoicing for a sales order. A customer invoice request object 1755 and a customer invoice object 1760 are handled during activities 1750. Instruction set 1720 includes data processing activities 1765 directed to due item processing for a sales order. Objects 1770, 1775, . . . are handled during activities 1765. One or more additional instruction sets 1725 includes data processing activities 1780 directed to additional data processing activities. Objects 1785, 1790, . . . are handled during activities 1780.

Among the data processing activities performed during instruction sets 1705, 1710, 1715, 1720, 1725 is the conveyance of information amongst objects 1735, 1745, 1755, 1760, 1770, 1775, 1785, 1790. Example conveyances include data flows 1791, 1792, 1793, 1794, 1795, 1796, 1797. Other conveyances of information are included among the data processing activities performed during instruction sets 1705, 1710, 1715, 1720, 1725 but, for the sake of clarity of illustration.

FIG. 18 shows system landscape 1700 after manual extension of sales order object 1735 by a user with an attribute 1805 and extension of data objects 1745, 1755, 1760, 1770, 1775, 1785, 1790 and data flows 1791, 1792, 1793, 1794, 1795, 1796, 1797. The extension of data objects 1745, 1755, 1760, 1770, 1775, 1785, 1790 and data flows 1791, 1792, 1793, 1794, 1795, 1796, 1797 can have been performed automatically, i.e., without user input. The automatic extension can have been performed on the basis of data objects 1745, 1755, 1760, 1770, 1775, 1785, 1790 being identified in a collection of objects (such as found in column 1520) and data flows 1791, 1792, 1793, 1794, 1795, 1796, 1797 being identified in a collection of data flows (such as found in column 1620) that are associated with sales order object 1735 acting in the role of originating objects, for example, in extension set table 1600 (FIG. 16).

The details of the extension are as follows. Object 1745 has been extended with an extension field attribute 1810. Customer invoice request object 1755 has been extended with an extension field attribute 1815. Customer invoice object 1760 has been extended with an extension field attribute 1820. Object 1770 has been extended with an extension field attribute 1825. Object 1775 has been extended with an extension field attribute 1830. Object 1785 has been extended with an extension field attribute 1835. Object 1790 has been extended with an extension field attribute 1840.

The extension of data flows 1791, 1792, 1793, 1794, 1795, 1796, 1797 is indicated by their increase in thickness. Data flow 1791 has been extended to convey information from attribute 1805 to attribute 1810. Data flow 1792 has been extended to convey information from attribute 1805 to attribute 1815. Data flow 1793 has been extended to convey information from attribute 1815 to attribute 1820. Data flow 1794 has been extended to convey information from attribute 1820 to attribute 1840. Data flow 1795 has been extended to convey information from attribute 1820 to attribute 1825. Data flow 1796 has been extended to convey information from attribute 1825 to attribute 1830. Data flow 1797 has been extended to convey information from attribute 1825 to attribute 1835.

Every data flow that involves an extended object, or an object that receives information from an extended object, is not necessarily extended. Indeed, in some circumstances, it may be desirable to omit certain data flows from extension and such omissions can be reflected in an extension set. For example, the flow of information that is private, confidential, proprietary or otherwise not intended for general distribution can be controlled using extension sets. In particular, an extension set can omit or prohibit certain data flows from carrying extensions. This is particularly useful, e.g., when a data flow involves the conveyance of information to another data processing system landscape.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing environment that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the environment can be interconnected by any form or medium of digital data communication (e.g., a communication network). Examples of communication networks include a local area network ("LAN"), a wide area network ("WAN"), and the Internet.

A number of implementations have been described. Nevertheless, it will be understood that various modifications may be made. For example, although this disclosure primarily discussed the extension of data flows that involved data types, data flows that involve abstractions such as business objects and user interfaces can also be extended. As another example, the order of certain activities can be changed and useful results achieved. As yet another example, the organization and content of data collections can be changed and useful results achieved. For example, the contents of one or more of tables 300, 500, 1500 can be merged and/or separated out into additional tables. As yet another example, an extension set can be identified in a data processing system landscape by the originating data type identifier found in originating data type identifier column 1510 and extension set identifier column 1505 can be omitted.

Accordingly, other implementations are within the scope of the following claims.

What is claimed is:

1. An article comprising one or more machine-readable media storing instructions, when executed by a processor, operable to cause one or more machines to perform operations, the operations comprising:
 receiving extension information identifying an extension of a first object in a data processing system landscape;
 accessing data flow information to identify one or more data flows that involve the first object, wherein the identified data flows convey stored information from one object to another; and
 extending, on the basis of identifying the one or more data flows as involving the first object, at least some of the one or more data flows so that information in the extension is conveyed between instances of the first object and instances of a second object during data processing in the data processing system landscape.

2. The article of claim 1, wherein extending at least some of the one or more data flows comprises mapping the extension of the first object to a particular attribute in the second object.

3. The article of claim 1, further comprising conveying information from the extension of a first instance of the first object to a second instance of the second object in accordance with an extended data flow.

4. The article of claim 3, wherein conveying the information from the extension to the second instance comprises generating a message to convey information from the first instance of the first object to the second instance of the second object.

5. The article of claim 4, wherein the message is to convey the information across a boundary between logical collections of machine-readable instructions in the data processing system landscape.

6. The article of claim 1, wherein accessing data flow information comprises accessing a data flow registry that identifies a source data object and a target data object in one or more data flows.

7. The article of claim 1, wherein further comprising:
 accessing the data flow information to identify one or more second objects that are involved in the one or more data flows that involve the first object; and
 extending the one or more second objects based at least in part on their identification in the data flow information.

8. The article of claim 1, wherein accessing the data flow information comprises accessing an extension set that associates
 a collection of object identifiers, the object identifiers identifying objects in a data processing system landscape, and
 a collection of data flow identifiers, the data flow identifiers identifying data flows in the data processing system landscape that involve the objects identified by the object identifiers.

9. The article of claim 8, wherein extending at least some of the one or more data flows comprises:
 extending the objects identified in the collection of object identifiers without input from a user; and
 extending the data flows identified in the collection of data flow identifiers without input from a user.

10. A method comprising:
 receiving attribute information describing a first additional attribute that is to be added to a first object in an installed data processing system landscape;
 based at least in part on the attribute information, adding a second additional attribute to a second object in the data processing system landscape;
 storing a description of a data flow between the first object and the second object, wherein the description reflects the first additional attribute and the second additional attribute; and
 during subsequent operational data processing activities in the data processing system landscape, accessing the data flow description and conveying information from the first additional attribute of an instance of the first object to the second additional attribute of an instance of the second object in accordance with the data flow description.

11. The method of claim 10, wherein accessing the data flow description comprises mapping, at an attribute-level, a conveyance of information from the first additional attribute to the second additional attribute to generate attribute mapping information.

12. The method of claim 10, wherein adding the second additional attribute to the second data object comprises:
 accessing a data flow registry that identifies a conveyance of information between the first object and the second object during operational data processing activities in the data processing system landscape; and
 adding the second additional attribute based at least in part on the identification of the conveyance in the data flow registry.

13. The method of claim 10, wherein conveying the information from the first additional attribute of the instance of the first object to the second additional attribute of the instance of the second object comprises generating a message that includes the information.

14. The method of claim 13, wherein generating the message comprises:
 accessing the data flow description that reflects the addition of the first additional attribute to the first object; and
 generating the message having a message structure that is mapped to reflect the addition of the first additional attribute to the first object.

15. The method of claim 10, wherein conveying the information from the first additional attribute of the instance of the first object to the second attribute of the instance of the second object comprises:
 receiving a message having a message structure that is mapped to reflect the addition of the first additional attribute to the first object;
 accessing the data flow description that reflects the addition of the first additional attribute to the first object; and
 conveying the information from the first additional attribute of the instance of the first object to the second attribute of the instance of the second object in accordance with the data flow description.

16. The method of claim 10, wherein storing the data flow description comprises storing a rule for conveying information from the first additional attribute of an instance of the first object to the second attribute of an instance of the second object.

17. The method of claim 10, wherein the first object and the second object are not involved in a same data flow but rather the information is conveyed from the first additional attribute to the second attribute over a third object.

18. A memory for storing data for access by operations performed by a data processing system, the memory comprising:
- an extension set data assembly stored in the memory, the extension set data assembly associating
  - a collection of object identifiers, the object identifiers identifying objects in a data processing system landscape that can be extended upon an extension to an object in the data processing system landscape to meet the requirements of a business scenario, and
  - a collection of data flow identifiers, the data flow identifiers identifying data flows in the data processing system landscape that involve the objects identified by the object identifiers and that can be extended to meet the requirements of the business scenario.

19. The memory of claim 18, wherein the extension set data assembly further associates an identifier of one or more originating objects in which the extension originates.

20. The memory of claim 18, wherein the extension set data assembly further associates multiple identifiers of originating objects in which the extension originates.

* * * * *